(12) United States Patent
Atxa et al.

(10) Patent No.: US 6,308,895 B1
(45) Date of Patent: Oct. 30, 2001

(54) GAS-FLOW CONTROL VALVE FOR A HEATING APPLIANCE

(75) Inventors: Maite Amozarrain Atxa, Mondragon; José J. Antxia Uribetxebarria, Aretxabaleta, both of (ES)

(73) Assignee: Fagor, S. Coop., Mondragon (ES)

( * ) Notice: Subject to any disclaimer, the term of this patent is extended or adjusted under 35 U.S.C. 154(b) by 140 days.

(21) Appl. No.: 09/603,109

(22) Filed: Jun. 22, 2000

(30) Foreign Application Priority Data

Jul. 23, 1999 (ES) .................................................. 9901669

(51) Int. Cl.[7] .................................................. G05D 23/00
(52) U.S. Cl. ............................................. 237/2 A; 137/335
(58) Field of Search ............................. 237/2 A; 137/79, 137/78.4, 335

(56) References Cited

U.S. PATENT DOCUMENTS

| | | | |
|---|---|---|---|
| 4,236,548 | * 12/1980 | Howard | 137/335 |
| 5,261,438 | * 11/1993 | Katchka | 137/15.09 |
| 5,419,356 | * 5/1995 | Katchka | 137/15.09 |

* cited by examiner

*Primary Examiner*—Harold Joyce
*Assistant Examiner*—Derek S. Boles
(74) *Attorney, Agent, or Firm*—The Kline Law Firm

(57) ABSTRACT

Gas flow regulation valve (1) for a heater appliance, comprising a valve body (2) with two axial valves (7,9) arranged in series, whose valve sealing members (7',8') are the lift type by means of a central valve stem (10), whose forward movement (e) is actuated by a stepped motor (3), a motor control unit (C) for its power supply, and a remote control (RC) provided with a room temperature sensor (16), which houses a number of valve operating programs (P), each of them containing four positions relative to the forward movement of the valve stem, in accordance with the fuel gas family and the type of heating appliance.

5 Claims, 2 Drawing Sheets

GAS-FLOW CONTROL VALVE FOR A HEATING APPLIANCE

BACKGROUND OF THE INVENTION

The present invention relates to the regulation of the fuel gas supply to a domestic heating appliance by means of a flow control valve which is operated by an electric motor, modulating the flow in response to the variations in temperature of the heated area, and the valve is the dual seat lift type.

FR-236742 discloses a gas flow control valve for a domestic gas boiler, wherein the flow of gas supplying the burner is regulated by means of the gradual opening of a valve hole in accordance with the temperature of the water supplied by the boiler, in three stages: minimum flow, gradual flow and maximum flow. The regulation valve has two series valve members coupled to a single valve stem, inside an internal gas chamber, which communicates the gas inlet pipe with the outlet pipe. The valve stem slides axially actuated by an electromagnet in accordance with the value of the electric current applied to the winding. The valve member for minimum flow is moved first of all to open a central through hole and it is mounted on the same stem as the high flow valve member. It is then lifted from its valve seat in a second gradual movement to let the high flow pass. For closure, each valve sealing member is forced in the opposite direction by its respective return spring.

U.S. Pat. No. 4,085,921 discloses a multi-mode gas control valve for a heating appliance, such as a water heater. The valve has a single seat and the sealing member takes the form of a flat disc, the flow opening being variable depending on the separating distance of the sealing member. In accordance with the variation in the value of the water temperature measured by a sensor, the valve control unit generates an analogue signal that supplies the actuating electromagnet to maintain the valve in different operating modes, with a minimum constant gas flow, a gradual intermediate flow, and a constant maximum flow.

EP-691495-A discloses a gas control valve for a heating appliance of the type with an axially sliding stem with a dual valve seat. The sealing members are in series in a single gas chamber between the inlet and outlet pipes and are provided with a respective spring mounted on the stem. The valve is operated by means of an auxiliary electromagnet with a sliding armature for opening and closing both valve passages, and a stepped motor for graduating valve opening according to an operating mode, which modulates the flow of gas supplied to the heating appliance, making use of an associated electronic control unit and various sensors.

SUMMARY OF THE INVENTION

The object of the invention is a gas flow control valve for a domestic room heating appliances, such as gas fireplaces, the body of the valve being the dual seat lift type, operated by a stepped motor controlled by an electronic unit. The valve stem moves both valve sealing members, taking up different positions relative to the two valve seats to alter the gas flow section and thereby control the delivery rate to the burner in response to the variations in room temperature. The different positions of valve stem forward movement are programmable, and they determine various programs for modulation of the flow supplied from an inlet conduct to an outlet conduct of the valve in accordance with the fuel gas family and the size of the heater appliance.

The operation of the stepped motor is governed by a control unit attached to the appliance by way of a remote control unit, which is provided with a room ambient temperature sensor. Low electricity consumption is a necessary condition of the electronic control unit and of the power-operated valve, as they are both supplied by a battery. Thus, the stepped motor is de-energized once the valve stem has been moved to a relative position programmed for the temporary supply of a constant flow. In the meantime transmission of rotation of the motor shaft to the valve stem is blocked and the corresponding gas flow opening at the two valve seats is kept fixed. A fresh deviation in the room temperature will cause the motor to be actuated by way of the control unit so that the valve stem moves to another position of greater or lesser gas flow to the burner.

The control unit is fixed to the motor and contains various valve actuating programs selected by the user from the remote control, each of these programs containing various motor supply instructions referring to an equal number of valve stem positions, each associated with a delivery flow value.

The valve body is of simplified construction, the metal body being of cylindrical shape, and the gas circulation conducts to the valve stem housing, the internal gas chambers and the valve seats machined by means of individual round holes drilled from the outside.

DESCRIPTION OF THE PREFERRED EMBODIMENT

Figure 2:
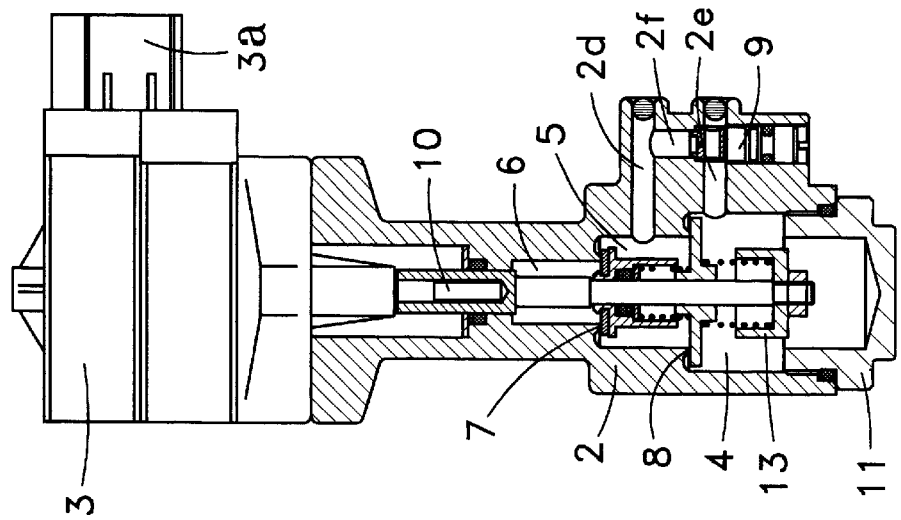
FIG. 2 is a longitudinal section view of the control valve of FIG. 1, according to line II—II, through the plane of the bypass conducts for minimum flow supply, in the "closed" position too.
Figure 1:
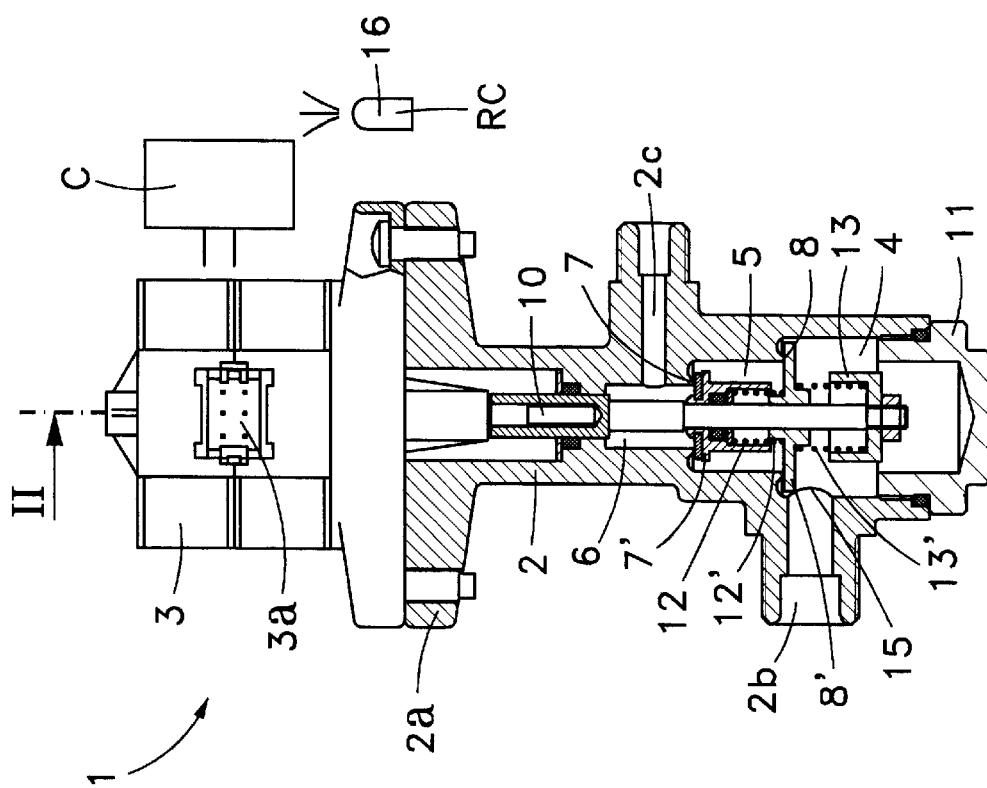
FIG. 1 is a longitudinal section view of the flow control valve according to the invention, through the plane of the gas inlet and outlet conducts and in the "closed" condition, showing also the electronic control unit.

In a preferred embodiment of control valve 1 according to the invention, depicted in FIGS. 1 to 4, the valve body 2 is cylindrical and has a coaxial stepped motor 3 coupled at one of the ends, and a control unit C attached to the motor 3 and connected by means of an electrical connector 3a belonging to the motor. FIG. 1 also shows a separate remote control RC, which has an ambient temperature sensor (16).

The valve body 2 is preferably a metal casting, which is later machined with round drills for the shaping of an upper flat base 2a for supporting and anchoring a stepped motor 3, a transverse gas inlet conduct 2b, to which there may be fitted a prior manual tap, a transverse outlet conduct 2c to the gas appliance burner, not shown in the drawings, a large axial inner gas enclosure 4,5,6, which communicates the inlet conduct 2b with the outlet conduct 2c, and which is divided by a first valve 7 and a second valve 8, both in series and operated by a single valve stem 10, two transverse gas flow bypass conducts 2d, 2e (FIG. 2) and a housing for a calibrated bypass screw. The forward movement of the valve stem 10 per step of the motor 3 is programmed preferably to be 2.5 mm.

The diameter of the gas enclosure 4,5,6 is stepped to facilitate its machining from a bottom opening 2d, which is sealed with a leaktight hollow plug 9. The series valves 7 and 8 are the lift type and are provided with sealing members 7' and 8'. respectively, in the form of a flat disk. The first valve 7, which opens first of all with the forward movement e of the valve stem 10 defines an outlet chamber 6 in communication with the gas outlet conduct 2c. The second valve 8, which opens secondly defines an intermediate chamber on either side between both valves 7 and 8, and an inlet chamber 4 in communication with the gas inlet conduct 2b.

The two sealing members 7', 8' are fitted around the valve stem and they are moving in relation to the stem. Each of them is pressed by its respective coil return spring 12', 13' for the closure of the respective valve when action of the motor 3 ceases. The spring 12' of the first valve 7 is of lower tension "k" than the spring 13' of the second valve 8, and it is partly housed in a hollow bush 12 that accompanies the first sealing member 7' in its forward movement.

The second valve 8 opens (FIG. 4) by means of a further forward movement e of the stem 10; after compressing the spring 12' of the first valve 7, the hollow bush 12 pushes the sealing member 8'. The second coil spring 13' is guided and comes up against a hollow bush 13 attached to the end of the stem 10. In this way, the second valve 8 will remain closed until the first sealing member 7' has completed a travel r in its separation from the seat (FIG. 3 and FIG. 5) and the tension of the second spring 13' is overcome by the subsequent forward movement e of the valve stem 10.

Figure 5:
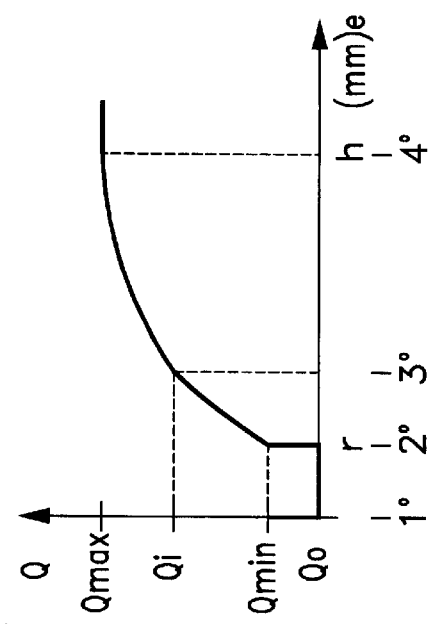
FIG. 5 is a diagram of the gas flow controlled by the valve of FIG. 1, in accordance with the control program selected.
Figure 4:
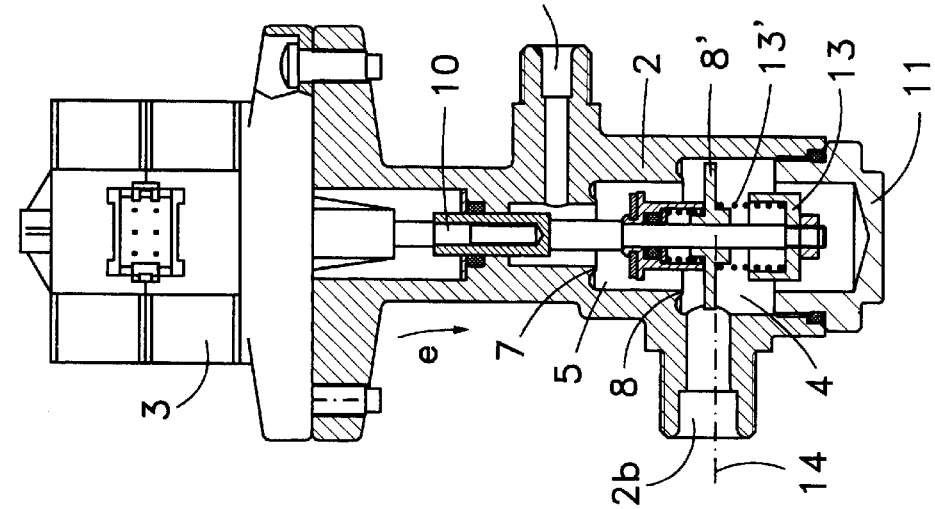
FIG. 4 is a cross-sectional view of the control valve as FIG. 1, but in the "maximum flow" supply condition.
Figure 3:
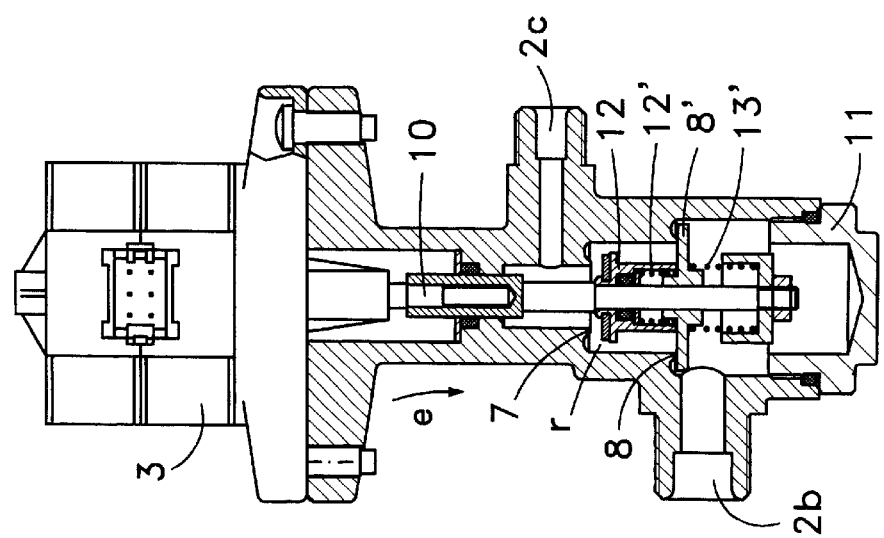
FIG. 3 is a cross-sectional view of the control valve as FIG. 1, but in the "minimum flow" supply condition.

In reference to FIG. 5, the valve operation program P is selected by the user and contains at least four modes of operating the control valve 1, each corresponding to a condition of the valve or forward movement position of the valve stem (1) relative to the seats of both valves 7,8 and to the inlet conduct 2b. In each of these operating modes, the valve 1 delivers a constant gas flow Q: in the 1st mode the motor 3 is de-energized and the flow "QO" is zero; in the 2nd mode the forward movement e is previous, of the same value r in all the programs P recorded in the control unit, the first valve 7 is open and the flow is minimal "Qmin"; in the 3rd mode the forward movement e of the stem is intermediate, the second valve 8 is partly open and the flow is medium "Qi"; in the 4th mode the second valve 8 is fully open and the flow is maximum "Qmax".

Figure 4A:
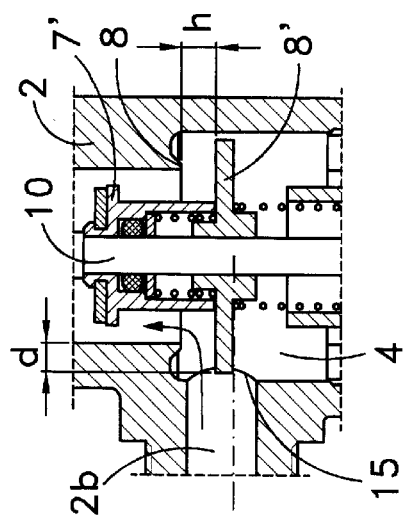
FIG. 4A is a close view of the flow opening in the control valve of FIG. 4.

In the medium flow condition Qi, the separation distance h (FIG. 4a and FIG. 5) of the sealing member 8' from the valve seat 8 and its position relative to the inlet conduct 2b vary according to the program P selected, to which there corresponds a given forward movement e of the stem 10. With the forward movement e the area of the delivery flow opening to the intermediate chamber 5 gradually increases due to the radial separation distance d and a half-round layout 15 of the intersection of the conduct 2b with the chambers 4 and 5. Different medium flows Qi are supplied according to the gas family.

The maximum flow Qmax is supplied with a maximum forward movement "e" of the valve stem 10, the same in all the programs P, wherein the sealing member 8' has reached a position relative to the inlet conduct 2b, according to line 14, which goes beyond the centre of the inlet 2b, the flow opening being the largest. The difference in the "Qmax" value for every gas family is established only by the mixture inlet injector.

For a minimum delivery flow "Qmin", it is necessary that only the first valve 7 should be open (FIG. 3), as the two bypass conducts 2d, 2e communicate the inlet chamber 6 with the intermediate chamber 5 by way of the bypass screw 9, bridging out the second valve 8.

The invention claimed is:

1. A gas flow control valve for a room heating appliance, with a valve member of the lift type in a cylindrical gas chamber, controlling the gas flow from an inlet conduct to an outlet conduct of the valve, wherein the valve modulates the gas flow supplied from said outlet conduct to the heating appliance in accordance with the ambient temperature measured, comprising:

a stepped motor for actuating an axially sliding valve stem and an electronic control unit attached to the motor for energizing and control of the motor;

a first valve member and a second valve member coupled in series to the valve stem, defining at least a gas chamber between the inlet and outlet conducts, that act successively on a respective valve seat for the delivery of the gas supply between a minimum flow and a maximum flow, by means of variation in the axial displacement of the stem;

wherein said control unit attached to the motor has various valve actuating programs recorded, each program comprising various operating modes relating to the gas flow supply in association with the forward movement of the valve stem, the extent of the displacement of which is determined by means of the combination of the emplacement of each of the valve members in relation to its respective valve seat with the position of the second valve member relative to the inlet conduct.

2. Gas flow regulation valve according to claim 1, wherein the two valve members are mobile relative to the valve stem, and they are forced by a respective coil return spring to close the valve, so the first valve member provided with a coil spring of a lower tension effects a prior forward movement before the opening of the second valve member for the supply of the minimum flow in all the program operating modes.

3. Gas flow control valve according to claim 1, wherein the second valve member defines a cylindrical gas chamber in communication with the inlet duct, and for the supply of an intermediate gas flow, after its forward movement for the opening of the valve hole, maintains a position relative to the intersection surface of the inlet conduct with said gas chamber.

4. Gas flow control valve according to claim 1, wherein said control unit attached to the motor has various valve actuation programs recorded for selection from a remote control provided with a temperature sensor.

5. Gas flow control valve for a room heating appliance, with a valve member of the lift type within a cylindrical gas chamber controlling the flow of gas from an inlet conduct to an outlet conduct of the valve, wherein the valve modulates the gas flow supplied from said outlet conduct to the heater appliance in accordance with the ambient temperature measured, comprising:

a stepped motor for actuating an axially sliding valve stem, and provided with an electronic control unit attached to the motor for energizing and control purposes;

a first valve member and a second valve member coupled in series to the valve stem, which define three series chambers in the gas enclosure, an output chamber in communication with the outlet conduct, an intermediate chamber between both valve members, and an intake chamber in communication with the inlet conduct, and which act successively on their respective valve seat to modulate the gas flow, between a minimum flow and a maximum flow, by means of altering the axial displacement of the stem to an extent determined by the axial position of the valve member relative to the inlet conduct intersection opening in the intake chamber.

* * * * *